United States Patent Office 3,548,213
Patented Dec. 15, 1970

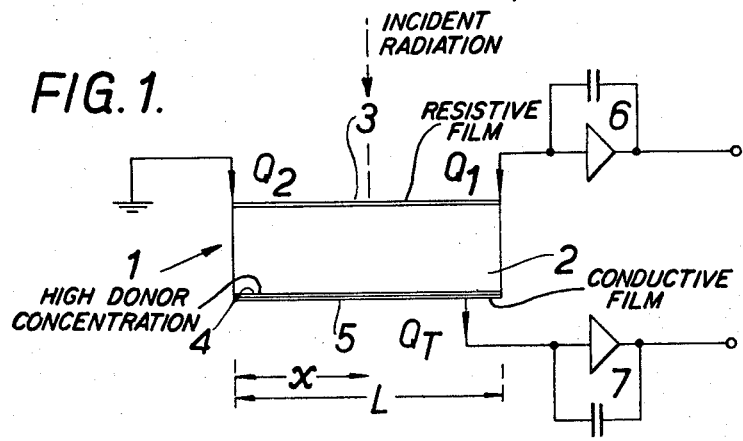
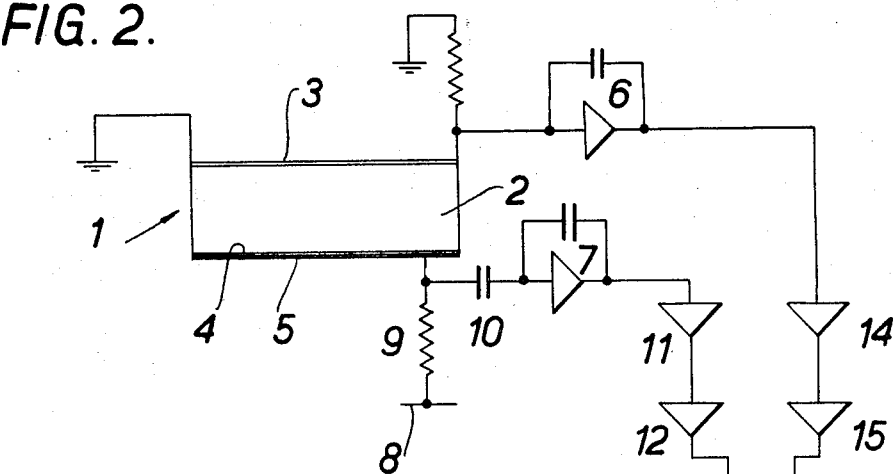
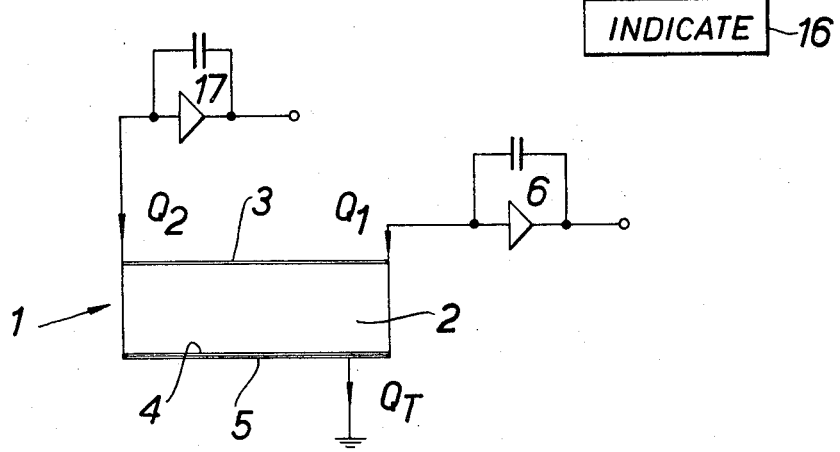

3,548,213
SEMICONDUCTOR RADIATION DETECTOR
ARRANGEMENTS
Richard Bruce Owen and Percy George Salmon, Abingdon, and Mervyn Leslie Awcock, Steventon, Abingdon, England, assignors to United Kingdom Atomic Energy Authority, London, England
Filed Oct. 12, 1967, Ser. No. 674,869
Claims priority, application Great Britain, Oct. 14, 1966, 46,170/66
Int. Cl. H01l 15/00
U.S. Cl. 250—211                                    7 Claims

ABSTRACT OF THE DISCLOSURE

A semiconductor radiation detector arrangement consists of wafer of n-type silicon with a resistive palladium film on one face to produce a rectifying contact and a gold film on the other face adjacent the initial depletion region. The comparative outputs of amplifiers connected, in effect, to opposite ends of the resistive film provide an indication of the position on the resistive film of an incident charged particle.

BACKGROUND OF THE INVENTION

This invention relates to semiconductor radiation detector arrangements, that is to say, arrangements for detecting ionising events resulting from the impact of a particle or a photon on a body of semiconductor material.

DESCRIPTION OF PRIOR ART

Recently there have been produced detector arrangements of this kind which enable the position of incidence of a charged particle to be detected. One such arrangement comprises a rectangular slice of n-type silicon on the front surface of which is a layer of gold which forms a surface barrier junction. At each end of the rear surface is a small ohmic contact of aluminium and these contacts are connected by a resistive film of bismuth.

During operation, potentials are applied to the gold layer and to the aluminium contacts such that a depletion region is created within the silicon. When an ionising event occurs in the depletion region due to an incident particle, the resulting charge is divided between the aluminium contacts in the inverse ratio of the distances from those contacts to where the ionising event occurred. By measuring the charge collected at each of the aluminium contacts the position at which the particle is incident can be determined.

Although initially such arrangements are satisfactory, the resistive film has only a limited life and it is necessary to renew this film at intervals of a few months. It is, therefore, an object of the present invention to provide a semiconductor radiation arrangement in which this disadvantage is avoided.

SUMMARY OF THE INVENTION

According to the present invention, a semiconductor radiation detector arrangement comprises a body of n-type silicon having on one surface a resistive film which forms a stable rectifying contact to the silicon, and on the opposite surface a conductive film which forms an ohmic contact to the silicon, and means to determine the relative proportions of the charge collected on the resistive film and resulting from an ionising event which flow to the two ends of the resistive film and hence the position in the length of the body at which the ionising event occurred.

Preferably the resistive film is formed by a film of metal having a resistance of the order of 1,000 ohms per square cm. The metal may be a noble metal, and palladium is preferred.

DESCRIPTION OF THE DRAWINGS

A semiconductor radiation detector arrangement in accordance with the present invention will now be described by way of example with reference to the accompanying drawing, in which:

FIG. 1 shows diagrammatically the main features of the arrangement,

FIG. 2 shows schematically the circuit of the detector arrangement of FIG. 1, and FIG. 3 shows diagrammatically the main features of a modified form of the arrangement of FIG. 1.

Referring to FIG. 1, the arrangement comprises a semiconductor radiation detector 1 formed by a body 2 of n-type silicon some 1 cm. by 5 cm. by .01 cm. On one major surface of the body 2 is provided by vacuum deposition a resistive film 3 of palladium which forms a stable rectifying contact to the silicon. The resistance of the film 3 is approximately 1,000 ohms per square cm. and hence the total resistance between the two ends of the film 3 is approximately 5 kilohms.

Phosphorus is thermally diffused into the other major surface of the body 2 to form a layer 4 some 0.2 micron thick which contains a high donor concentration. The silicon surface is then cleaned and a film 5 of metal is then vacuum evaporated on to this surface, so forming an ohmic contact to the silicon. During operation, potentials are applied to the films 3 and 5 such that a depletion region extends from the film 3 into the body 2 or even right through to the layer 4.

One end of the film 3 is earthed and the other end is connected to a charge amplifier 6 having a virtual-earth input. The film 5 is connected to a similar amplifier 7.

Let L be the length and R the resistance of the film 3. If, during operation, ionisation is produced in the depletion region at a distance $x$ from the earthed end of the film 3, a charge $Q_T$ will be transferred across the depletion region producing a change $V_x$ in the potential of the film 3 at $x$. Currents $I_1$, and $I_2$ will then flow in the film 3 until it again has a uniform potential. The total charges $Q_1$ and $Q_2$ flowing to the amplifier 6 and to earth respectively, where:

$$Q_1 + Q_2 = Q_T$$

are given by:

$$Q_2 = \int_0^\infty I_2 dt = \frac{L}{xR} \int_0^\infty V_x dt$$

and $$Q_1 = \int_0^\infty I_1 dt = \frac{L}{(L-x)R} \int_0^\infty V_x dt$$

whence:

$$Q_1 = \frac{x}{L} Q_T$$

So long as the integration times of the amplifiers 6 and 7 are longer than the times taken for the potentials in the detector 1 to return to their quiescent values, the outputs from the amplifiers 6 and 7 are linear functions of the charges $Q_1$ and $Q_2$, and hence to the distance $x$.

Referring to FIG. 2, this shows schematically a possible circuit for the arrangement described in FIG. 1. The operating potential is derived from a supply line 8 which is maintained at a suitable positive potential so as to apply a reverse bias to the detector 1 by way of a resistor 9. The potential applied will depend on the purity of the silicon and may vary between 20 and 400 volts. The film 4 is connected to the amplifier 7 by way of a suitable blocking capacitor 10, and the output of the amplifier 7 is connected by way of an amplifier and shaper 11 and a logarithmic amplifier 12 to a subtraction circuit 13. One end of the film 3 is earthed and the other end is connected by way of the amplifier 6, an amplifier and shaper 14 and a logarithmic amplifier 15 to the subtraction circuit 13, the output of which is connected to an indicating device 16.

The circuit operates in such a way that the subtraction circuit 13 supplies an output signal proportional to the ratio of the charges $Q_T$ and $Q_1$, and the indicating device 16 is calibrated in such a way as to provide from this an indication of the distance $x$.

Referring now to FIG. 3, this shows a modification to the arrangement of FIG. 1. It differs only in that the amplifier 7 is replaced by a similar amplifier 17 connected to the other end of the film 3. The charge flowing to the amplifier 17 is given by:

$$Q_2 = \left(1 - \frac{x}{L}\right) Q_T$$

so that:

$$\frac{x}{L} = \frac{Q_1}{Q_1 + Q_2}$$

As before, therefore, a suitable circuit arrangement can be provided to give an indication of the distance $x$.

Although palladium is the preferred material for the film 3, other materials may be used, although metals, and in particular noble metals, are particularly suitable to give the required stable rectifying contact.

A two-dimensional indication of the position at which a charged particle is incident may be obtained by using two detectors 1, one behind another with their axes at right angles. This arrangement will, however, only operate if the incident particle has sufficient energy to penetrate both detectors, 1.

What we claim is:

1. A semiconductor radiation detector arrangement comprising a body of n-type silicon, a resistive film on one surface of said body which forms a stable rectifying contact to the silicon, a conductive film on the opposite surface of said body which forms an ohmic contact to the silicon, first and second means located at the opposite ends of said resistive film for conducting current, and means for determining the relative proportions of the charge, transferred to the resistive film responsive to an ionizing event, collected at said first and second current conducting means and hence the position along the length of the body at which the ionizing event occurred.

2. An arrangement as claimed in claim 1 wherein the resistive film is of palladium metal and has a resistance from end to end of 1000 ohms per square cm.

3. An arrangement as claimed in claim 1 wherein said first current conducting means comprises means for connecting one end of the resistive film to earth, said arrangement further comprising a first amplifier having its input connected to the second current conducting means and its output to a subtraction circuit, means for applying a reverse bias potential to the conductive film, a second amplifier having its input connected through a blocking capacitor to the conductive film and its output to said subtraction circuit, and means for indicating the magnitude of the difference signal from said subtraction circuit.

4. An arrangement as claimed in claim 1 comprising a first amplifier having its input connected to said first current conducting means, a second amplifier having its input connected to said second current conducting means and means relating the outputs of said amplifiers for indicating the position of incident radiation.

5. An arrangement as claimed in claim 1 further comprising means for determining the total charge collected on the resistive film.

6. An arrangement as claimed in claim 1 further comprising a p-region formed by diffusion at the surface to which ohmic contact is made.

7. An arrangement as claimed in claim 6 further comprising means for determining the total charge collected on the resistive film.

References Cited

UNITED STATES PATENTS

| | | | |
|---|---|---|---|
| 2,879,405 | 3/1959 | Pankove | 250—211 |
| 3,207,902 | 9/1965 | Sandborg | 250—211X |
| 3,211,911 | 10/1965 | Ruhge | 250—211X |
| 3,435,232 | 3/1969 | Sorensen | 250—211X |

WALTER STOLWEIN, Primary Examiner

U.S. Cl. X.R.

317—235